March 29, 1932.   J. F. SIEMS   1,851,597

FURROWING-OUT ATTACHMENT

Filed Feb. 18, 1931

INVENTOR
JOHANN F. SIEMS,
By: Otto H. Ringler,
his Atty.

Patented Mar. 29, 1932

1,851,597

UNITED STATES PATENT OFFICE

JOHANN F. SIEMS, OF LOS ANGELES, CALIFORNIA

FURROWING-OUT ATTACHMENT

Application filed February 13, 1931. Serial No. 516,692.

This invention relates to devices used for making furrows in orchards.

One of the objects of this invention is to provide an attachment including two discs set at such an angle and designed that it may function as an independent furrowing device attachable to any cultivator or specially designed vehicle.

Another object is to provide a simplified furrower with a draw-bar between the two discs and mounted to swivel in a vertical and horizontal plane.

Other objects will appear from the following description and appended claim as well as from the accompanying drawings, in which—

Figure 1:
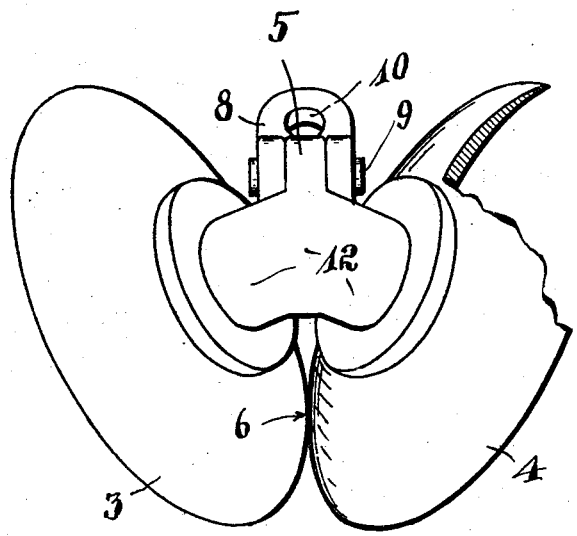
Fig. 1 is a rear view of the attachment embodying this invention.
Figure 2:
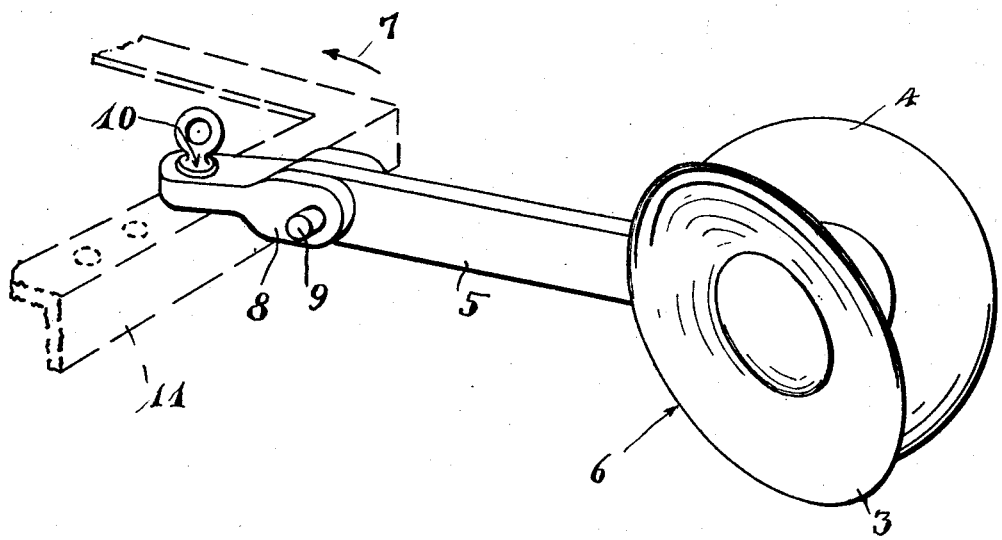
Fig. 2 is a perspective illustration of the attachment having a portion of a customary cultivator indicated in dotted lines to show the cooperative position of the furrower when applied to such a cultivator.

As illustrated, the two discs 3 and 4 are turnably mounted on opposite sides of the draw-bar 5.

The discs are disposed inclined in such a manner that small portions of the two discs will be closest at a point, as indicated at 6, in a downwardly and forwardly direction with respect to the moving direction of the cultivator, as indicated at 7. This arrangement also tends to act favorably on the discs to keep them a suitable distance in the ground without digging-in effect.

A double-pivoted link 8 is provided on the forward end of the draw-bar 5, the draw-bar to swing in a practically vertical plane with respect to the axis of the pin or pivot 9, while the whole attachment including discs, drawbar, and link can swing around the axis of the pin 10 in a practically horizontal plane.

While a disc cultivator has been roughly indicated in dotted lines at 11, illustrating how the attachment disclosed herewith may be applied to such a cultivator, it will easily be understood that the attachment can be used with and applied to various types of farming implements or vehicles, with one or more furrowers in use in the manner of the one indicated in the drawings.

Though no particular showing has been made for the supporting means 12 at the free end of the draw-bar for the discs, it must be understood that any sort of bearing, either common box or ball or roller bearing, may be used to support the pins or shafts of the discs, depending very largely on the customer who is going to purchase a unit of this type and on the price individual customers or users may be willing to pay for such an attachment.

Having thus described my invention, I claim:

A furrowing attachment comprising a swivel-link with pivots disposed transversely to each other, a draw-bar swingably connected to one of said pivots at one end and having a double supporting means at the opposite end with axes slanting to one another and with respect to the draw-bar in a downward and forward direction, and a pair of concave-convex cultivating discs turnably mounted on the supporting means of said draw-bar with the concaved sides facing outwardly.

In testimony that I claim the foregoing as my invention I have signed my name.

JOHANN F. SIEMS.